(12) United States Patent
Levy

(10) Patent No.: US 7,336,357 B2
(45) Date of Patent: Feb. 26, 2008

(54) MULTI-CHANNEL DUAL PHASE LOCK-IN OPTICAL SPECTROMETER

(75) Inventor: Jeremy Levy, Pittsburgh, PA (US)

(73) Assignee: University of Pittsburgh, Pittsburgh, PA (US)

( * ) Notice: Subject to any disclaimer, the term of this patent is extended or adjusted under 35 U.S.C. 154(b) by 118 days.

(21) Appl. No.: 11/202,211

(22) Filed: Aug. 12, 2005

(65) Prior Publication Data

US 2007/0252988 A1    Nov. 1, 2007

Related U.S. Application Data

(60) Provisional application No. 60/601,136, filed on Aug. 13, 2004.

(51) Int. Cl.
*G01J 3/06* (2006.01)
*G01J 3/18* (2006.01)
*G01J 3/28* (2006.01)

(52) U.S. Cl. ........................ 356/328; 356/308
(58) Field of Classification Search ............... 356/308, 356/326, 328
See application file for complete search history.

(56) References Cited

U.S. PATENT DOCUMENTS

| 5,434,666 A | * | 7/1995 | Carnahan et al. ........... 356/328 |
| 5,532,873 A | | 7/1996 | Dixon |
| 5,653,539 A | | 8/1997 | Rosengaus |
| 5,841,570 A | | 11/1998 | Velsko |
| 6,122,051 A | * | 9/2000 | Ansley et al. ............... 356/326 |
| 6,141,100 A | | 10/2000 | Burka et al. |
| 6,717,668 B2 | | 4/2004 | Treado et al. |

FOREIGN PATENT DOCUMENTS

WO    WO 01/89119 A2    11/2001
WO    WO 03/031923 A1    4/2003

OTHER PUBLICATIONS

Abstract from Smithsonian/NASA ADS Physics Abstract Service Title:Multichannel Lock-in Optical Spectrometer, Author: Jeremy Levy, Publication: American Physical Society, Annual APS March Meeting 2003, Mar. 3-7, 2003, Abstract #H14.003, Origin: APS.*

(Continued)

*Primary Examiner*—F. L. Evans
(74) *Attorney, Agent, or Firm*—Foley & Lardner LLP

(57) ABSTRACT

The development of a multiple-channel dual phase lock-in optical spectrometer (LIOS) is presented, which enables parallel phase-sensitive detection at the output of an optical spectrometer. The light intensity from a spectrally broad source is modulated at the reference frequency, and focused into a high-resolution imaging spectrometer. The height at which the light enters the spectrometer is controlled by an acousto-optic deflector, and the height information is preserved at the output focal plane. A two-dimensional InGaAs focal plane array collects light that has been dispersed in wavelength along the horizontal direction, and in time along the vertical direction. The data is demodulated using a high performance computer-based digital signal processor. This parallel approach greatly enhances (by more than 100×) the speed at which spectrally resolved lock-in data can be acquired.

17 Claims, 10 Drawing Sheets

OTHER PUBLICATIONS

J.J. Baumberg et al., "Ultrafast Faraday Spectroscopy in Magnetic Semiconductor Quantum Structure", Physical Review B, vol. 50, No. 11, Sep. 15, 1994, pp. 7689-7700.

O. Breitenstein et al., "Microscopic lock-in thermography investigation of leakage sites in integrated circuits", Review of Scientific Instruments, vol. 71, No. 11, pp. 4155-4160, Nov. 2000.

R. H. Dicke, "The Measurement of Thermal Radiation at Microwave Frequencies", The Review of Scientific Instruments, vol. 17, No. 7, Jul. 1946, pp. 268-275.

A. Feofanov et al., "A new confocal stigmatic spectrometer for micro-Raman and microfluorescence spectral imaging analysis: Design and applications", Rev. Sci. Instrum. 66 (5), May 1995, pp. 3146-3158.

Zuyuan He et al., "Selective Image Extraction by Synthesis of the Coherence Function Using Two-Dimensional Optical Lock-In Amplifier with Microchannel Spatial Light Modulator", IEEE Photonics Technology Letters, vol. 9, No. 4, Apr. 1997, pp. 514-516.

W.E. Moerner et al., "Methods of single-molecule fluorscence spectroscopy and microscopy", Review of Scientific Instruments, vol. 74, No. 8, Aug. 2003, pp. 3597-3619.

Pierre-Alain PROBST et al., "Multiple-channel digital lock-in amplifier with PPM resolution", Rev. Sci. Instrum. 65 (3) Mar. 1994, pp. 747-750.

P.S. Fodor et al., "320-channel dual phase lock-in optical spectrometer", Review of Scientific Instruments, 76, (2005) 013103-1—013103-7.

M.J. Snelling et al., "Magnetic g factor of electrons in GaAs/$Al_xGa_{1-x}$ As quantum wells", Physical Review B, vol. 44, No. 20, Nov. 15, 1991, pp. 345-352.

Toshiyuki Kawasaki et al., "Highly sensitive measurement of surface charge distribution using the Pockets effect and an image lock-in amplifier", J. Phys. D: Appl. Phys. 27 (1994) 1646-1652.

http://www.aps.org/meet/MAR03/baps/abs/S2940003.html Jeremy Levy, "[H14.003] Multichannel Lock-in Optical Spectrometer", University of Pittsburgh, Department of Physics, American Physical Society, Annual APS March Meeting 2003, Mar. 3-7, 2003, *Abstract.

http://tech-link.tt.pitt.edu/industry_technologies.nmedical.html University of Pittsburgh Office of Technology Management, For Industry:Technologies Available Non Medical Technologies, Case List Aug. 3, 2005, pp. 1-5.

McPherson Multiple Fiber Imaging Spectrometer, Chelmsford MA, USA, pp. 1-2. No date.

http://www.mcphersonInc.com/systems/mfi/mfi.htm McPerson Multi Fiber Imaging Spectrometer, Systems and Applications with McPherson Monochromators & Spectrometers, Jul. 27, 2005, pp. 1-3.

Jeremy Levy, "Oxide-Semiconductor Materials for Quantum Computation", North American Molecular Beam Epitaxy conference (NA-MBE) Keystone, CO, Oct. 2, 2003.

* cited by examiner

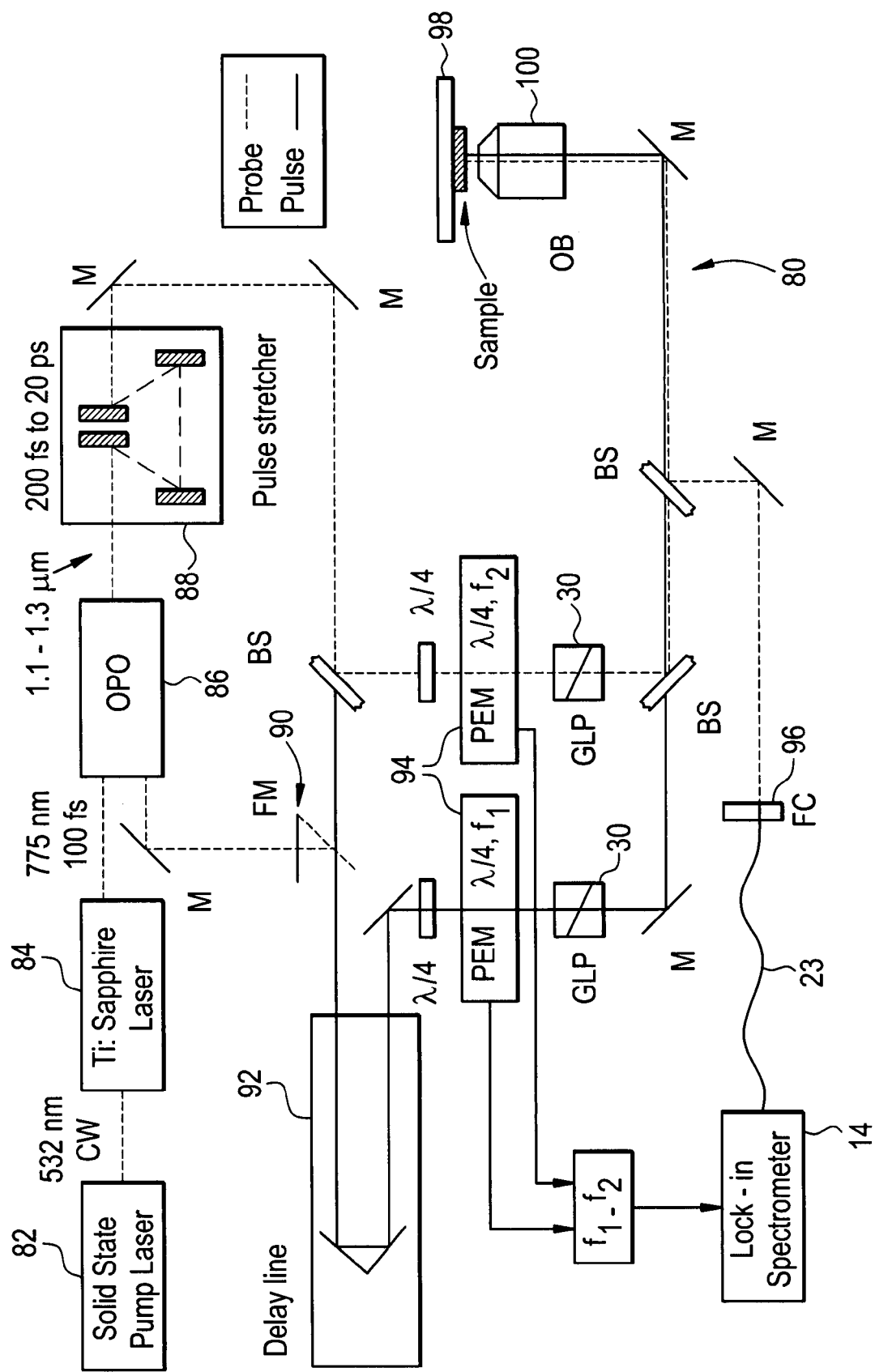

MULTI-CHANNEL DUAL PHASE LOCK-IN OPTICAL SPECTROMETER

CROSS-REFERENCE TO RELATED PATENT APPLICATIONS

This application claims benefit of priority of U.S. Provisional Application Ser. No. 60/601,136, filed on Aug. 13, 2004 and is incorporated herein by reference in its entirety.

The U.S. government may have certain rights in this invention pursuant to DARPA grant number DAAD 10-01-1-0650.

BACKGROUND OF THE INVENTION

This invention is related to optical spectroscopy, specifically to a lock-in optical spectrometer system.

Optical spectroscopy is a pervasive tool across physical, chemical and biological sciences. In a typical spectrometer, the light focused on the entrance slit is dispersed by a diffraction grating which spatially separates the light according to wavelength. Spectroscopic information is obtained by scanning the angle of the diffraction grating, and allowing different wavelengths to pass through an exit slit. The availability of photodetectors, such as one dimensional charge-coupled device (CCD) and two dimensional focal plane array (FPA) detectors has greatly reduced the amount of time required for the acquisition of optical spectra. Further parallelization has been achieved by using so-called "imaging" spectrometers (or spectrometers) that are optimized to preserve the vertical point-spread function of the spectrometer, allowing multiple input fibers to be imaged onto different horizontal portions of the detector array without interference. The increased throughput of such parallel techniques has become critical for applications such as Raman spectroscopy and near-field scanning optical microscopy, where the signals of interest are small and background-free.

For many applications, the signal of interest is superimposed upon a large noisy background. Applications that fit this description include spectrophotometry, and a wide variety of linear and nonlinear spectroscopies in which information about the sample is encoded in the intensity or polarization of light. A simple background subtraction can be achieved by synchronizing the frame acquisition to an optical chopper or similar modulator. However, the spectral response of such a technique is functionally equivalent to a comb filter and thus is less effective than bandwidth narrowing methods that use true lock-in amplification. Furthermore, the range of frequencies available is limited by the frame rate which is usually quite low compared to the frequencies at which one would like to operate. Laser noise usually falls off significantly above a few kHz, higher than the rates of most high-sensitivity photometric imaging devices such as charge-coupled devices (CCDs) and focal-plane arrays (FPAs). As a consequence, phase-sensitive detection or lock-in amplification is the method of choice in the above mentioned situations. However, due to the high photon fluxes and large backgrounds, it is not straightforward to parallelize lock-in techniques.

A straightforward implementation of a lock-in optical spectrometer (LIOS) requires a one-dimensional detector array and a minimum of one lock-in channel per detector. Lock-in amplifiers that employ digital signal processing (DSP) methods have rapidly replaced the original analog lock-in amplifier design. Digital lock-ins have superior phase stability and dynamic range, making them favorable for most demanding applications except perhaps mili-Kelvin transport experiments where digital circuitry is usually avoided. Banks of up to 32 digital lock-in channels are commercially available (http://www.signalrecovery.com), but for a reasonable number of channels (e.g., 256 or 512), this approach quickly becomes financially burdensome and unwieldy.

SUMMARY OF THE INVENTION

An embodiment of the invention provides an optical system comprising a light deflector which is adapted to deflect light in a direction as a function of time, a spectrometer which is adapted to separate light according to wavelength in a direction which is different from the direction of the light deflected by the light deflector, and a focal plane array. The focal plane array is adapted to detect the light separated according to wavelength by the spectrometer along a first direction and to detect light deflected as a function of time by the light deflector along a second direction different from the first direction.

BRIEF DESCRIPTION OF DRAWINGS

FIG. 8 demonstrates the use of the system of the first embodiment of the invention in a typical optical setup for a pump-probe experiment.

DETAILED DESCRIPTION OF THE EMBODIMENTS OF THE INVENTION

Figure 1:
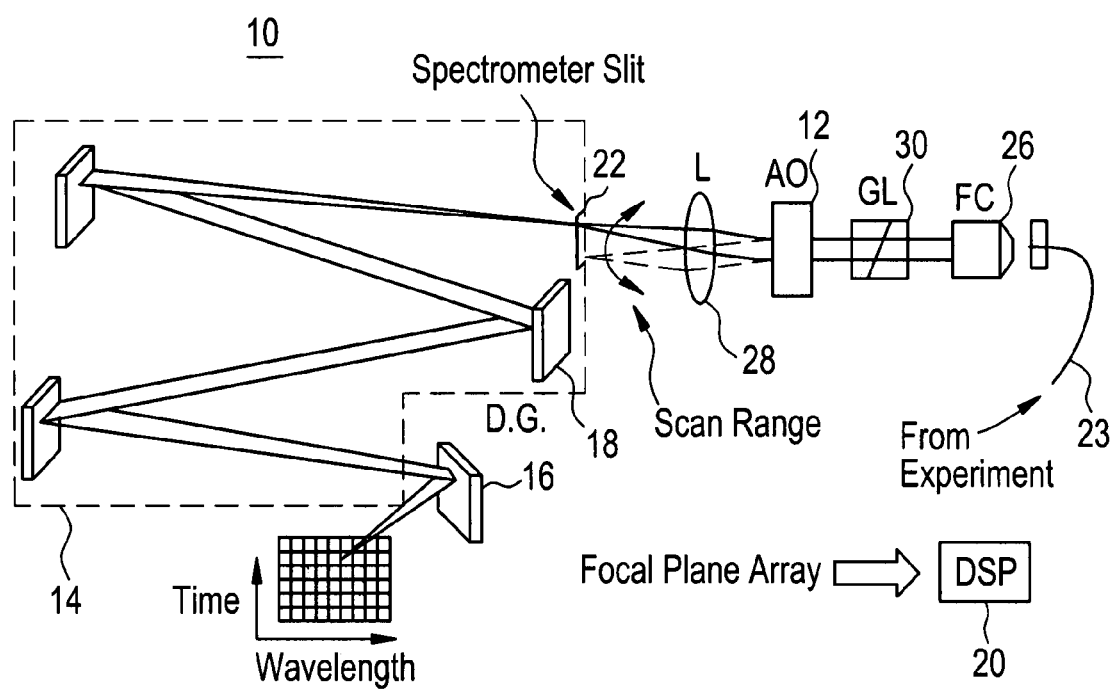
FIG. 1 shows a schematic drawing of the lock-in spectrometer optical setup utilizing an optical system of a first embodiment of the invention.

An optical system 10 of the first embodiment is shown in FIG. 1. The system includes a light deflector 12 which is adapted to deflect light in a particular direction as a function of time. For example, this may be a vertical direction. However, other directions, such as horizontal may also be used. The system 10 also includes a spectrometer 14 which is adapted to separate light according to wavelength in a direction which is different from the direction of the light deflected by the light deflector. For example, if the deflector 10 deflects the light in a vertical direction, then the spectrometer may separate the deflected light in a horizontal direction. However, other separation directions are also possible. The system also contains a two dimensional photodetector array 16, which is generally referred to herein as a focal plane array.

The focal plane array 16 is adapted to detect the light separated according to wavelength by the spectrometer 14 along a first direction and to detect light deflected as a function of time by the light deflector 12 along a second direction different from the first direction. For example, if the light is deflected by the deflector 12 in a vertical direction and if the light is separated by wavelength by the spectrometer 14 in a horizontal direction, then the focal plane array 16 may detect the light separated according to wavelength by the spectrometer 14 along the horizontal direction and detect light deflected as a function of time by the light deflector 12 along the vertical direction.

However, the wavelength separeated light provided from spectrometer 14 may be rotated by optical beam shaping components before it reaches the detector array 16. Thus, the light incident on the array 16 does not have to have the same temporal and wavelength direction as the light which exits the spectrometer 14. For example, the focal plane array 16 may detect the light separated according to wavelength by the spectrometer 14 along the vertical direction and detect the light deflected as a function of time by the light deflector 12 along the horizontal direction. Other directions are also possible.

Preferably, the focal plane array 16 comprises a two-dimensional semiconductor photodetector having a plurality of rows and columns of pixels, where each row of pixels is adapted to detect the light separated according to wavelength by the spectrometer for a given time. In other words, the wavelength separated light from the spectrometer 14 is incident on a different row of pixels in the focal plane array 16 at different time.

The system 10 also includes a digital signal processor 20 electrically connected to the array 16. The digital signal processor 20 is adapted to Fourier decompose a time-domain information provided from the array 16 to produce X and Y lock-in outputs for every wavelength channel.

The optical spectrometery method which may be performed on the system 10 comprises deflecting incident light in a direction as a function of time, separating the deflected light according to wavelength in a direction which is different from the direction of the light deflection, and detecting the light separated according to wavelength along a first direction in a detector and detecting light deflected as a function of time along a second direction in the detector, where the second direction is different from the first direction.

It should be noted that the term "light" as used herein should not be considered to be limited only to visible light. The term "light" includes optical radiation, such as ultraviolet, visible and/or infrared light or radiation.

The spectrometer system 10 may be used for any suitable application for which spectrometers are used, such as optical spectroscopy, Raman spectroscopy, photospectrometry, time-resolved absorption, time-resolved Kerr/Faraday rotation, etc. Photospectrometery includes but is not limited to all suitable types of chemical and biological spectrometric analysis based on optical transmission and/or absorption measurements. This includes suitable bioassay measurements. Certain organic molecules and biomaterials, such as proteins, antigen, etc., exhibit absorption lines in absorption and/or transmission spectra, when they are irradiated by incident radiation, such as infrared, visible and sometime UV radiation. Thus, organic molecules, polymers, monomers and biomaterials, which may not exhibit luminescence, may be identified and/or characterized by examining their absorption and/or transmission spectra. Likewise, inorganic materials, such as semiconductor, glass or ceramic materials may also be identified and/or characterized using the spectrometer.

The implementation of a multiple-channel lock-in optical spectrometer (LIOS) of the first embodiment enables phase sensitive detection methods to be applied in parallel, greatly enhancing the speed (by more than 100×) with which data can be acquired, is described here. In particular, the operating principle of the LIOS and the noise performance characteristics of a working system optimized for an approximately 1300 nm wavelength range is described. Operation is demonstrated using a commercial 1310 nm laser diode. Time-resolved linear absorption measurements have also been performed on InAs quantum dots embedded in a GaAs matrix, as well as on films obtained by dispersing colloidal solutions of PbSe nanocrystals.

A first embodiment of the invention combines the parallelism of an imaging device with the DSP capabilities of modern lock-in amplifiers. The first embodiment of the invention is shown as an optical diagram of LIOS system 10 depicted in FIG. 1. The elements of the system 10 of FIG. 1 include a light deflector 12, a wavelength separator device, such as spectrometer 14 and a photodetector array, such as a focal plane array (FPA) 16. In particular, the light deflector 12 is preferably a high-efficiency acousto-optic deflector (AOD) such as that obtainable from A-A Opto-Electronic. The spectrometer 14 is preferably high-resolution spectrometer which comprises a diffraction grating component 18, such as that obtainable from McPherson Inc. The grating 18 may be a part of a Czerny-Turner monochromator. The photodetector array 16 is preferably a focal plane array (FPA), but may comprise other two-dimensional photodetector arrays. For example, the array 16 may be two-dimensional InGaAs focal plane array, such as the Phoenix NIR Camera, obtainable from Indigo Systems. A high-performance digital signal processor (DSP) 20, such as a computer which performs DSP tasks is electrically connected to the photodetector array 16 for demodulating the output on the photodetector array.

During operation, light from a light source is deflected by the light deflector 10, such as the AOD, which diffracts the light and scanning the light vertically along an entrance slit 22 of the spectrometer 14. The light source may be coupled into a polarization-preserving single-mode optical fiber 23 and expanded and collimated into a 6 mm diameter light beam 24 using a fiber decoupler 26. A collimating lens 28 is subsequently used to focus the light beam through the entrance slit 22 of the spectrometer 14. The fiber decoupled light beam 24 may also pass through a Glan-Laser polarizer 30 to be polarized prior to being deflected by the light deflector 12. If desired, the fiber 23 may be omitted and the incident light may be provided into the spectrometer 14 without the fiber.

The AOD used as the light deflector 12 is preferably controlled by a radio-frequency (RF) source that can be amplitude-modulated (AM) and frequency-modulated (FM) in order to control the intensity and angle of the deflected beam respectively. Both AM and FM control signals are produced by synchronized arbitrary waveform generators.

The exemplary AOD for the LIOS has an efficiency of 85% at 1.3 μm and a deflection range of 40 mrad. Generally, better vertical imaging is achieved with longer focal length F spectrometers, so a focal length of F=2.0 (f/#=14.1) for the spectrometer 14 is chosen. A ray-tracing analysis of the selected spectrometer 14 indicates that a 10 μm diameter spot incident on the entrance slit 22 forms approximately a 32 μm diameter spot on the photodetector array 16.

The photodetector array 16 may comprise of a two-dimensional FPA of InGaAs square pixel detectors (320 horizontal×256 vertical), 30 μm in size, with sample-and-hold circuitry behind each pixel. The number of vertical and horizontal pixels as well as the pixel size and shape may be varied as desired. The maximum deflection efficiency of the AOD covers only about half of the vertical range of the FPA camera, therefore only a subset of the FPA, comprising $n_v$=128 vertical pixels by $n_h$=320 horizontal pixels, is used. The InGaAs FPA camera is sensitive in the near-infrared region (0.81 μm-2.6 μm) and has a specified noise-equivalent irradiance (NEI) <1.5×10$^{-7}$ W cm$^{-2}$ for the gain setting employed. The FPA camera is equipped with four 14-bit analog-to-digital converters (ADCs) operating from a 40 MHz bus, allowing data transfer rates of up to 80 MB/sec. Optimal throughput is achieved using "integrate-while-read" (IWR) mode, in which data from the previous frame is transmitted while the current frame is being acquired.

The photodetector array 16 encodes optical information in both the spectral and time domain. As shown in FIG. 1, during the acquisition of a frame, light is dispersed by the spectrometer 14 along the horizontal axis according to wavelength, and by the light deflector 12 along the vertical direction according to time. The acquisition is triggered by a TTL signal that is phase-locked to a reference frequency $f_R$, enabling phase-sensitive detection.

Figure 2A:
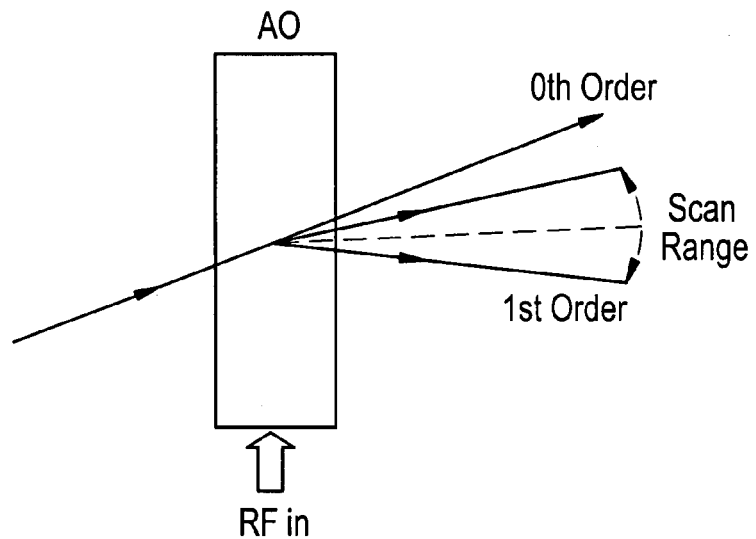
FIGS. 2A-2C illustrates the operation of alternative beam/light scanners that may be used as a light deflector in the first embodiment of the invention.
Figure 2B:
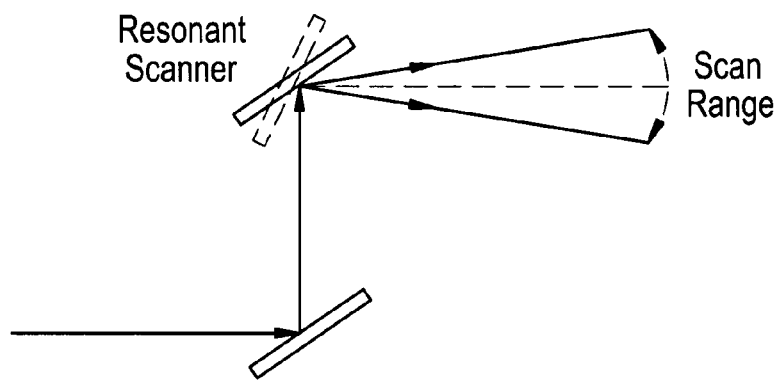
Figure 2C:
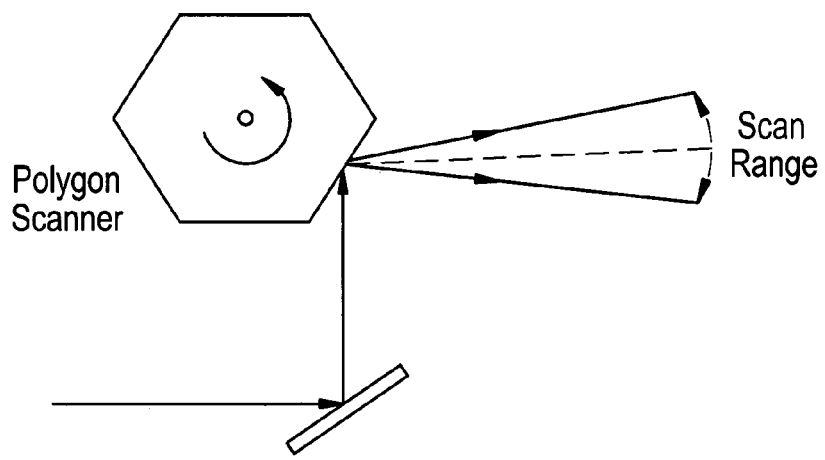

Alternative light deflection methods and devices may also be used. FIG. 2A shows the currently described accousto-optical deflection method used. For broadband spectral applications, an AOD provides 50-70% diffraction efficiency. This efficiency represents a significant degradation of the signal if compared to the use of a scanned mirror instead. However, to achieve the large scan angles for a scanned mirror used for this application, either a resonant mirror scanner (as shown in FIG. 2B) or a polygon scanner (as shown in FIG. 2C) may be used as the deflector 12. The high quality factor and narrow frequency tunability of resonant scanners make them unattractive for phase-sensitive applications. Furthermore, given the sinusoidal nature of their deflection angle, the amount of "dead time" becomes effectively comparable to the diffraction efficiency of an AOD. Polygon scanners, on the other hand, do not have the same problems with dead time, but are difficult to phase-lock to external sources in the stable manner required by phase sensitive methods. Consequently, the flexibility and programmability of the AOD far outweigh the limitations on its deflection efficiency as compared to the scanned mirrors and hence is preferably used as the light deflector 10 in the first embodiment of the invention. However, the devices shown in FIGS. 2B and 2C may be used instead of the AOD as the deflector 12 if desired. Another advantage of the AOD is the ability to use the AM capabilities for calibrating the LIOS. The calibration procedure is described as follows.

A. Digital Signal Processing

The sequence of images obtained by the FPA 16 is transferred in real time to a personal computer 20 (Pentium Xeon dual processor @ 2.2 GHz, 4 GB RAM) which digitally processes the output signals. For simplicity's sake, the digital signal processing described here is for the case of monochromatic light, i.e. only a single spectral channel is involved. The generalization to multiple channels is straightforward.

Figure 3:
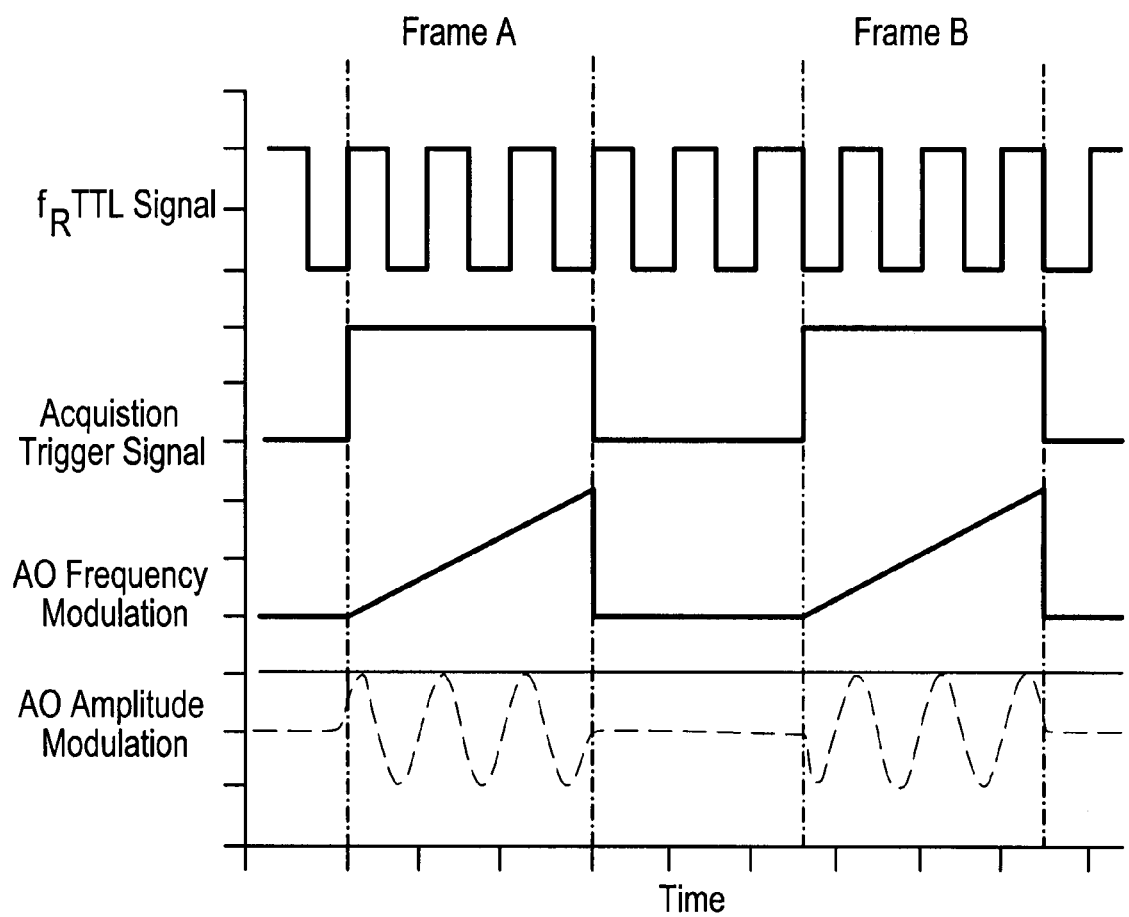
FIG. 3 illustrates a triggering diagram for the data acquisition and acousto-optical deflector control of the first embodiment of the invention.

Functions of time (treated as a continuous index t) are represented with tildes (e.g., $\tilde{f}(t)$), and occasionally are written without an explicit time index (i.e., $\tilde{f}$). In a LIOS measurement, the signal of interest is modulated at a fixed reference frequency $f_R$. The signal $\tilde{S} \equiv \{\tilde{S}(t), t_0 \leq t \leq t_0 + mTR\}$, where m is an integer, represents the time-dependent intensity measured by a fixed detector. This signal is encoded by LIOS in the following manner. As seen in FIG. 3, the frequency of the AOD is ramped linearly in time, triggered by the phase of the reference signal. Signals controlling the AM are shown both for normal operation (———) and calibration (- - -). The deflected light from the AOD 12 is focused by the collimating lens 28 into the spectrometer 14 and subsequently imaged onto a photodetector array 16 such as an one-dimensional array of pixels (i.e., one of the plurality of rows of pixels) from the FPA 16.

In principle, it should be possible to calibrate the spectrometer 14 in order to extract lock-in information directly from the output of the photodetector array 16. While it is possible to model the entire system accurately, taking into account nonlinearities and non-uniformities from the AOD, and variations in pixel gain and offsets from the FPA, there is a much more straightforward and accurate method of extracting lock-in signals from the measured response, which is described below.

The LIOS detector can be regarded as a mapping C from the input signal $\tilde{S} \equiv \tilde{S}(t)$ onto an array of pixel intensities $S=\{S_k, k=\ldots,n_v\}$:

$$\tilde{S} \xrightarrow{C} S.$$

Because there are a finite number of pixels, this mapping is not invertible; however, it preserves the spectral information of interest, namely, the Fourier components at the reference frequency as well as higher harmonics, provided the number of effective vertical pixels exceeds the Nyquist criterion:

$$n_v^{\text{eff}} \geq 2m.$$

(The number of effective vertical pixels is given by $$n_v^{\text{eff}} = n_v \frac{t_{scan} f_R}{PSF},$$

where $t_{scan}$ is the time it takes to scan the photodetector array 16 with the AOD, and PSF is the point-spread function FWHM. For the present system, PSF ~3 with a 10×10 μm aperture.

For lock-in detection, it is necessary to define an appropriate scalar product or metric for applying Fourier decomposition methods to the image of the original signal. The following metric is useful for determining the Fourier coefficients of a signal $\tilde{S}(t)$ that is periodic in T:

$$\langle \overline{A} | \overline{B} \rangle \equiv \frac{2}{T} \int \overline{A}(t)\overline{B}(t)dt.$$

With this definition, a natural basis for the space of square-integrable functions is given by $\overline{X}o(t) \equiv 1/\sqrt{2}$, $\overline{X}_k(t) \equiv \cos(2\pi k f_R t)$, $k=1,2,\ldots$ and $\overline{Y}_l(t) \equiv \sin(2\pi l f_R t)$, $l=1, 2,\ldots$. These basis functions have the property $\langle \overline{X}_k | \overline{Y}_l \rangle = 0$ and $\langle \overline{X}_k | \overline{X}_l \rangle = \langle \overline{Y}_k | \overline{Y}_l \rangle = \delta_{kl}$, where $\delta_{kl}$ is the Kronecker delta function. Fourier decomposition of an arbitrary function $$\overline{S}(t) = \sum_{k=0}^{\infty} a_k X_k(t) + \sum_{k=1}^{\infty} b_k Y_k(t) \text{ is given by } a_n = \langle \overline{S} | \overline{X}_n \rangle \text{ and } b_n = \langle \overline{S} | \overline{Y}_n \rangle.$$

Because there is no direct access to $\overline{S}(t)$, the task is to find the best estimate for $a_n$ and $b_n$, given the measured array of pixel values $S_k$. Formally, this can be done by defining a scalar product for the domain of C: $[A,B] \equiv \langle C^{-1}\overline{A} | C^{-1}\overline{B} \rangle$. The mapping C is singular (non-invertible), but singular value decomposition (SVD) may be used to find the best estimates for $a_n$ and $b_n$.

Figure 4:
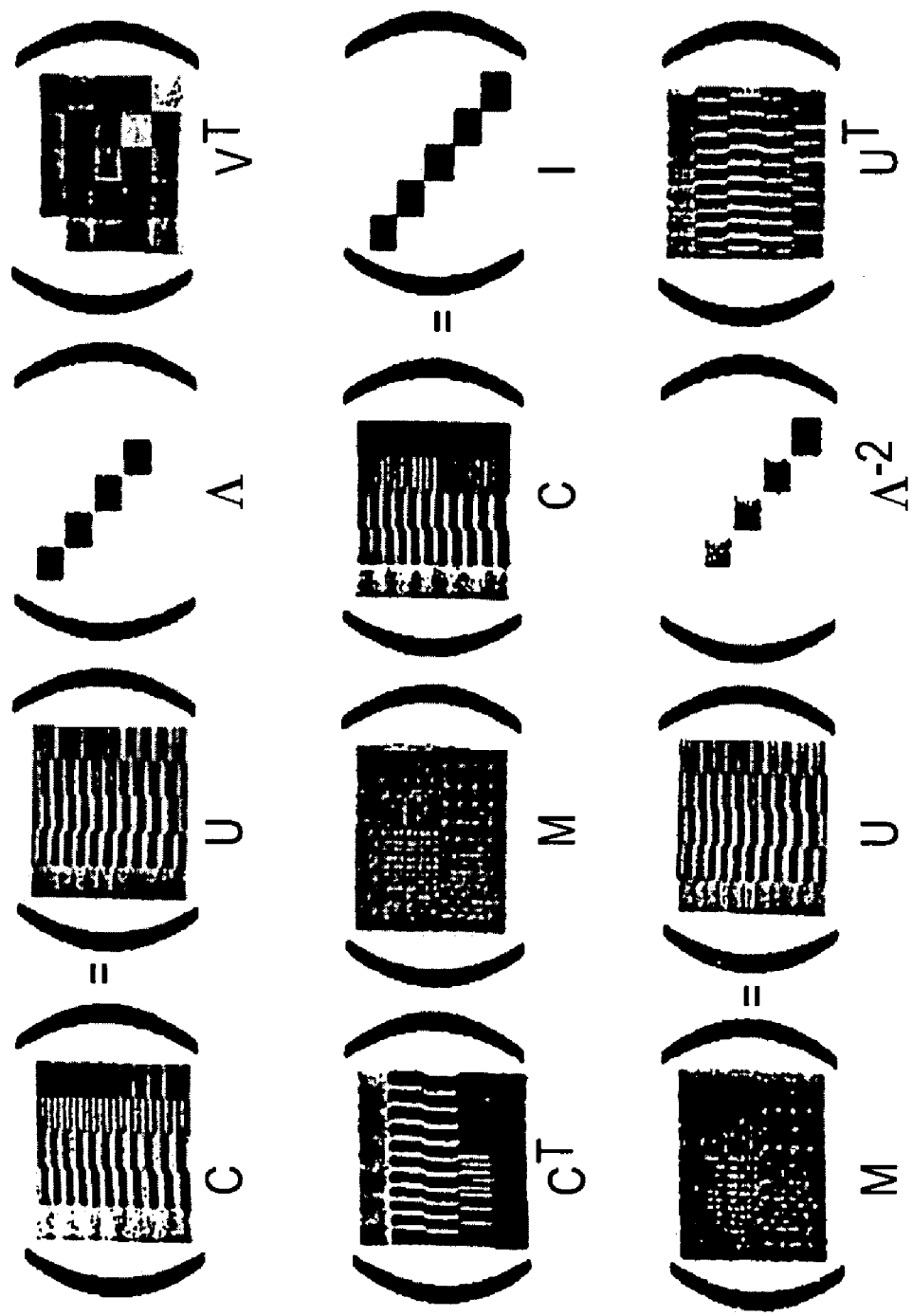
FIG. 4 shows a graphic representation of a metric M extraction from calibration signals for a single wavelength channel.

The first step is to calibrate the system by measuring images of the basis functions $\overline{X}_n$ and $\overline{Y}_n$. These functions are measured by amplitude modulating the AOD at the appropriate frequency and phase. A matrix C can be constructed as follows: $C = (X_0 | X_1 | Y_1 | X_2 | Y_2 | \ldots)^T$. This matrix is a representation of the mapping C, and can be used construct a metric. Using SVD, $C = U \cdot \Lambda \cdot V^T$ may be written. A metric M can be generated from this decomposition, with the property that: $C^T \cdot M \cdot C = I$. Simple mathematics gives: $M = U \cdot \Lambda \cdot U^T$. The determination of M for a single wavelength channel is graphically represented in FIG. 4. The Fourier coefficients of interest of $ab \equiv (a_0, a_1, b_1, a_2, b_2, \ldots)$ can be quickly calculated from a measurement S using the metric M as follows: $ab = C^T M S$.

Figure 5A:
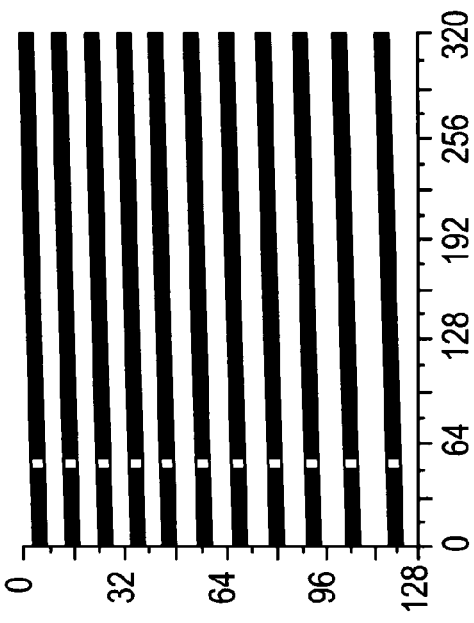
FIGS. 5A and 5B illustrate the images of the $\sin(\omega_L t)$ and $\cos(\omega_L t)$ reference vectors respectively.
Figure 5B:
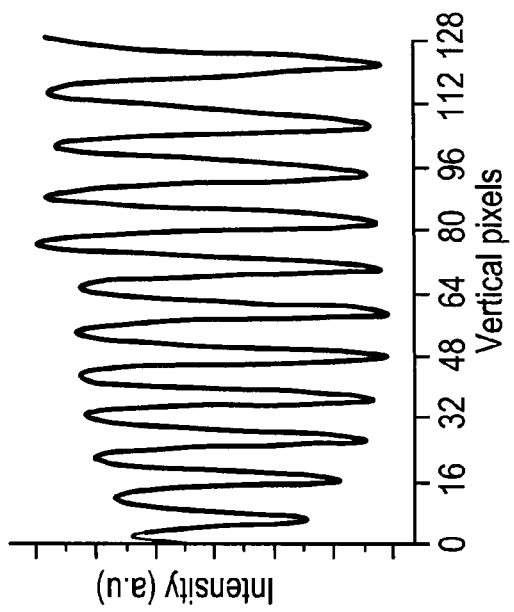
Figure 5C:
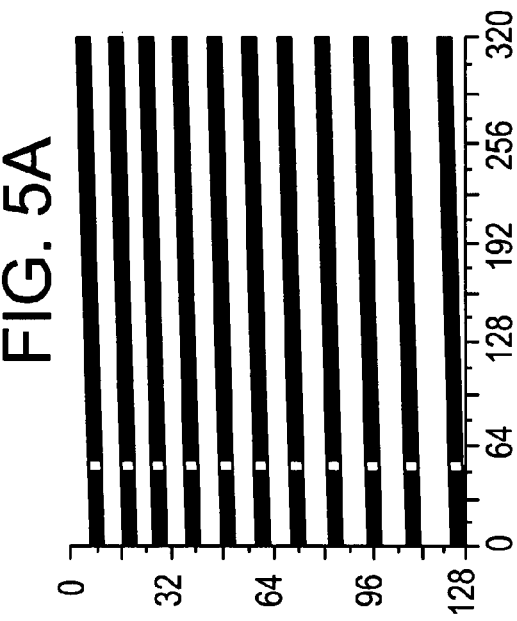
FIGS. 5C and 5D show the line cuts of intensity along wavelength channel 54 of FIGS. 5A and 5B, respectively.
Figure 5D:
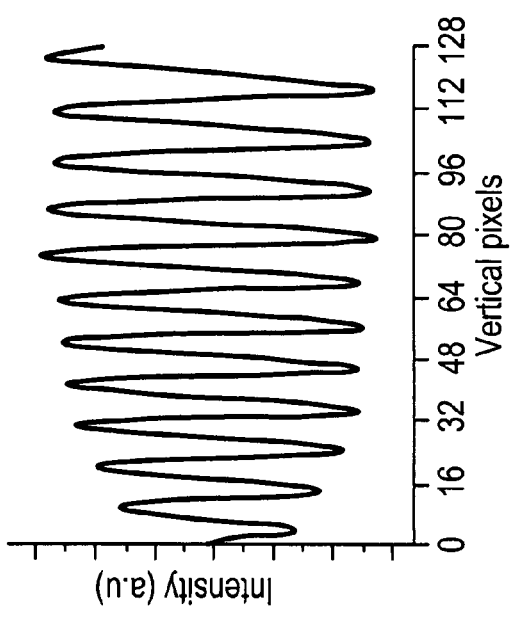

FIGS. 5A and 5B show, respectively, sine and cosine reference images obtained by acquiring 1000 individual frames for a modulation frequency $f_R = 42$ kHz. The 5° shear observed in the images comes from intrinsic dispersion in the AOD. This shear does not impact the performance of the design, since each wavelength channel is demodulated using its own mutually orthogonal reference vectors, independent of the other channels. Vertical cuts along the wavelength channels give periodic functions as expected. FIGS. 5C and 5D shows the periodic function along the wavelength channel 54. The number of periods observed is determined by $t_{scan} f_R$, where $t_{scan}$ is the vertical scanning time.

Figure 6:
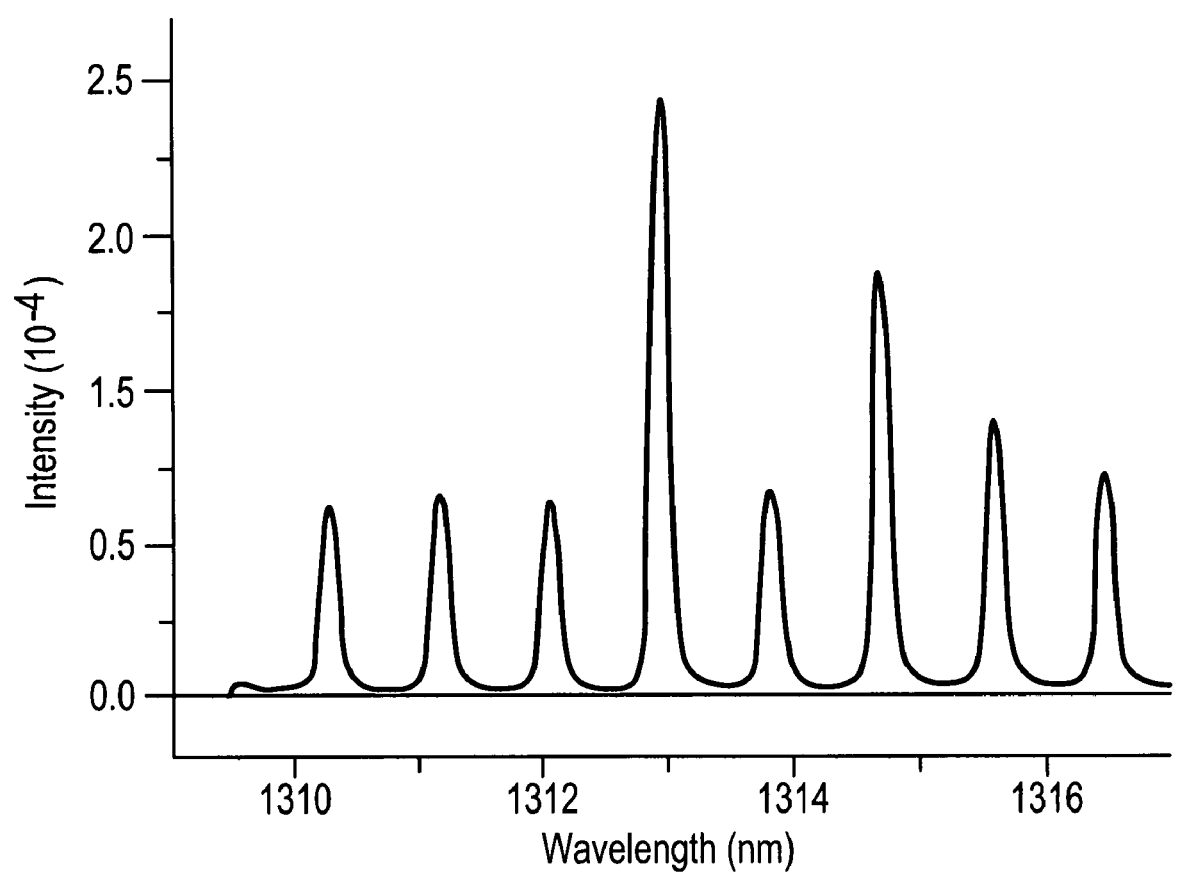
FIG. 6 shows a 1310 nm diode laser spectrum obtained after demodulation.

The functionality of the LOIS has been tested using a 1310 nm diode laser, such as that obtainable from Thorlabs Inc, with the intensity modulated at 42 kHz. After the demodulation of the acquired signal image from the photodetector array 16, a high-resolution spectrum (8 nm in range), as illustrated in FIG. 6, of the diode output is obtained. The speed at which spectrally resolved data can be acquired is enhanced by more than two orders of magnitude, compared with a scanning diffraction grating setup.

B. Noise Characterization

Figure 7:
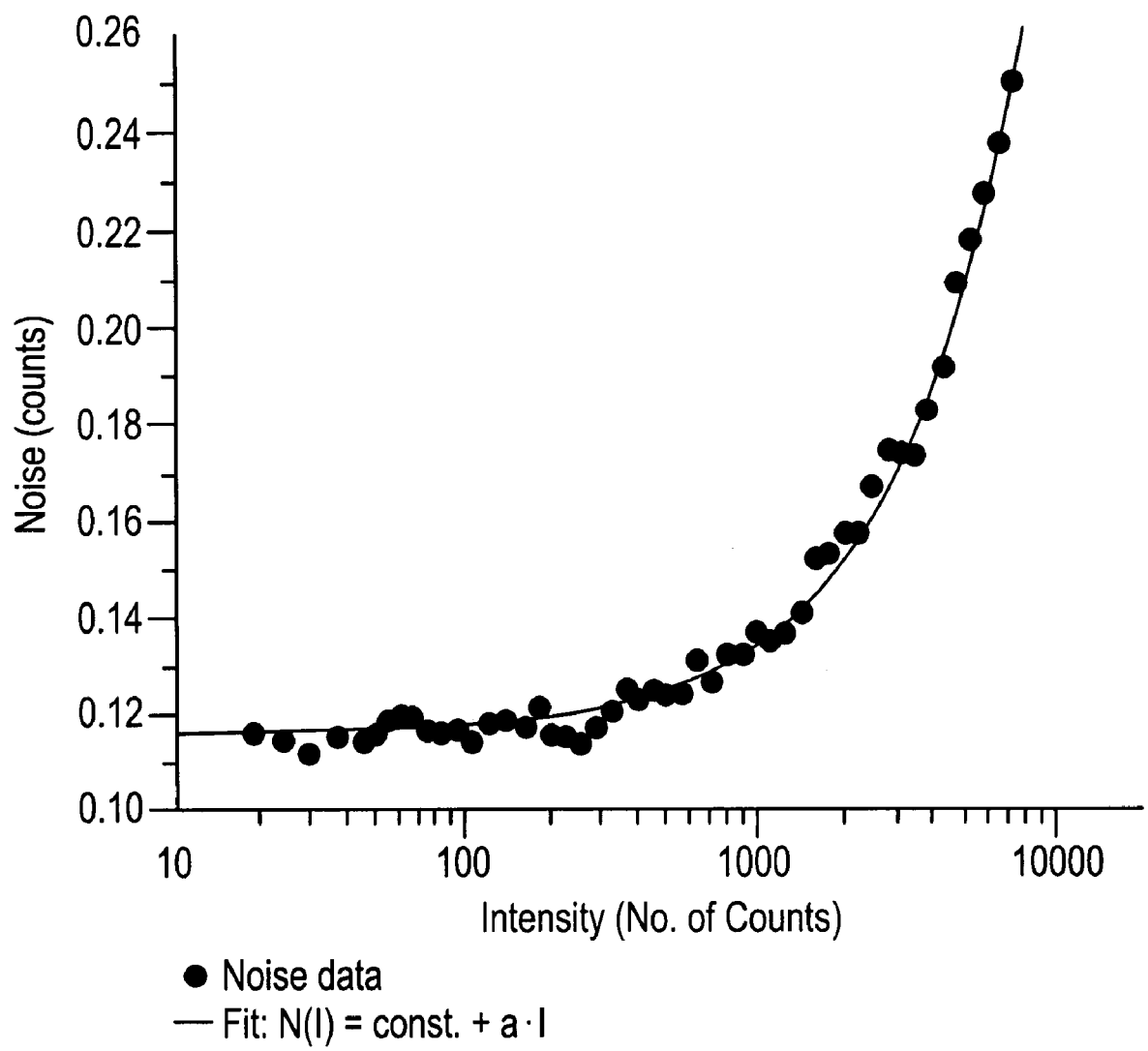
FIG. 7 illustrates noise dependence as a function of light intensity.

The system noise is characterized using an optical parametric oscillator laser such as the Opal from Spectra Physics, Inc., tuned at 1250 nm with a FWHM of 17 nm. In particular, the root-mean-square (RMS) noise was measured as a function of the input light source intensity. Typically, three major noise sources have to be considered: FPA camera noise (comprised of thermal noise and electronic circuit noise), laser noise and shot noise. The different noise sources can be distinguished by measuring their different dependence on the input light source intensity. While the camera noise is independent on the light intensity, both laser and shot noise monotonically increase with the light intensity following different dependencies: linear and square root respectively. For the first embodiment of the invention, the noise data is accurately fitted with a linear function added to a constant background, as shown in FIG. 7. This indicates that the performance of the optical system is limited only by the laser noise and the intrinsic noise of the FPA camera, with the former becoming dominant above 1000 counts/wavelength channel.

C. Specific Examples

The system of the first embodiment of the invention, optimized for 1.3 μm wavelengths, was used to study carrier and spin dynamics in two semiconductor systems: dispersed films of PbSe nanocrystals prepared by Evident Technologies through an organo-metallic route and InAs quantum dot arrays grown epitaxially on GaAs substrates. Both systems are optically active in the 1.21 μm-1.5 μm range in which the efficiency of the LIOS peaks.

Time-resolved signals are obtained from the samples using a pump-probe experiment in which ultra-short pump pulses (120 fs) create well-defined carrier populations in the sample, which are subsequently probed using time-delayed probe pulses. A typical optical set-up 80 employed in the experiment, as shown in FIG. 8, allows both degenerate ($\lambda_{pump} = \lambda_{probe}$) and non-degenerate ($\lambda_{pump} < \lambda_{probe}$) experiments to be performed. The system 80 contains a CW pump laser (532 nm) 82, a Ti Sapphire pulsed probe laser (775 nm, about 100-120 fs) 84, an optical parametric oscillator 86, a pulse stretcher 88 (200 fs to 20 ps), a flipper mirror 90, a delay stage or line 92, photoelastic modulators (PEM) 94, a fiber coupler 96, a sample support stage 98 and a 40× objective 100, as well as a plurality of beam splitters (BS) and mirrors (M). The spectrometer 14, fiber 23 and polarizers 30 shown in FIG. 8 are the same elements as in FIG. 1. The pump beam is shown by the dashed line while the probe beam is shown by the solid line.

The flipper mirror 90 allows switching from a degenerate to a non-degenerate experiment. The delay stage 92 comprises a mechanical optical delay stage with a retro-reflector, which is used to change the delay between the pump beam and the probe beam. For the set-up 80 presented, the time resolution is not limited by the delay stage 92, but by the pulse stretcher 88 used to expand the probe pulse from 200 fs to 20 ps, in order to reduce the peak power and avoid non-linear self-modulation effects in the optical fiber 23 used for coupling into the spectrometer 14 with a fiber coupler 96. However, no relevant time information is lost due to the pulse expansion, since for the systems studied the relevant time scales are in the nanosecond range.

1. Films of PbSe Nanocrystals Deposited on Fused Silica Substrates

Figure 9A:
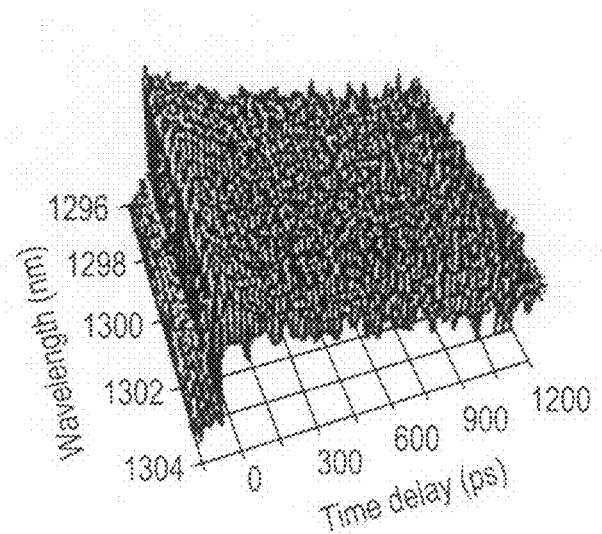
FIG. 9A shows the linear absorption on PbSe films obtained by precipitation of colloidal nanocrystals using the set up of FIG. 8.
Figure 9B:
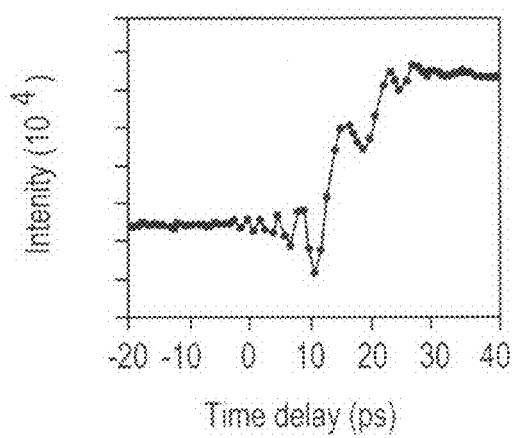
FIG. 9B shows the averaged data over the 320 channels of the lock-in spectrometer.
Figure 9C:
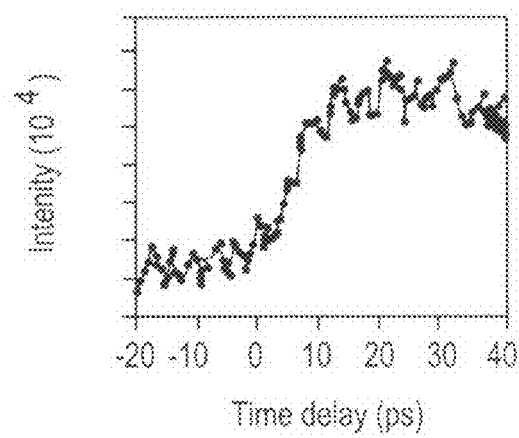
FIG. 9C shows the same data averaged over all the wavelengths obtained directly from a InGaAs detector.

The time resolved linear absorption response, at 70K, from films of PbSe nanocrystals deposited on fused silica substrates are shown in FIG. 9A. The 1.31 μm output (FWHM=17 nm) of the optical parametric oscillator 98 was used to both pump and probe the system 80. Both the pump and the probe are intensity modulated using the photo-elastic modulators 100 at $f_1 = 42$ kHz and $f_2$ 47 kHz respectively and the lock-in detection is performed at the difference frequency $f_1-f_2=5$ kHz in order to eliminate interference effects arising from the scattered pump in the detection line. Averaged data over the 320 wavelength channels of the LIOS is shown in FIG. 9B. On the other hand, data collected over a similar time span using an identical experimental setup, but directly from an InGaAs photodetector and conventional lock-in, as illustrated in FIG. 9C, shows a deteriorated signal to noise ratio, arising from the less efficient data collection and the lack of demodulation capabilities along individual wavelength channels. The oscillations observed around zero delay for the lock-in spectrometer data is an artifact of the diffraction on the 50 μm slit of the spectrometer. The effect is reproducible and easily subtracted.

2. InAs Quantum Dot Systems Grown on a GaAs Substrate

Figure 10:
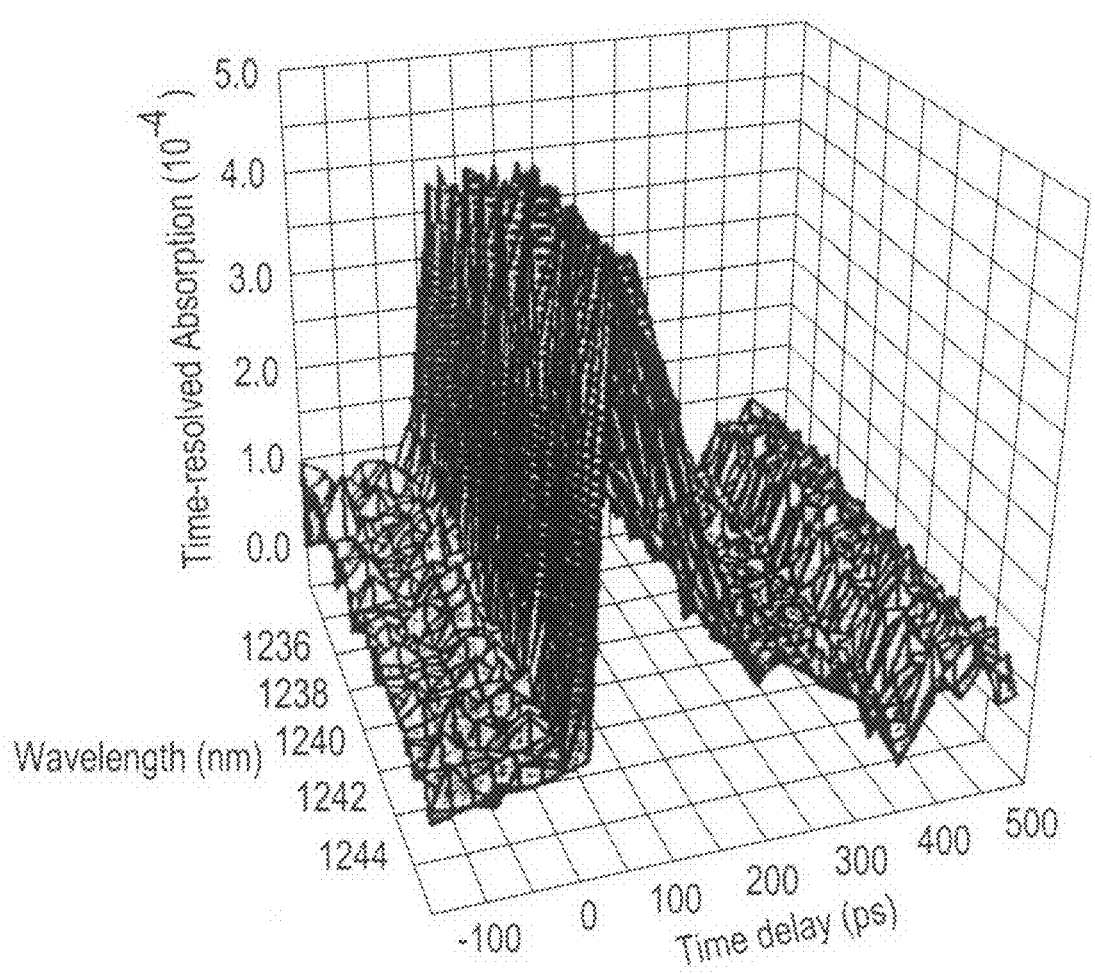
FIG. 10 illustrates the pump-probe linear absorption on InAs quantum dots by acquiring data in parallel on 320 channels covering a wavelength range of 8 nm.

The carrier dynamics in InAs quantum dots systems grown on a GaAs substrate, was probed using a non-degenerate set-up with the pump tuned to 775 nm and the probe to 1240 nm. The exciton pairs are created in the GaAs matrix and subsequently diffuse in the wetting layer and the quantum dots, where they relax to the ground state. Since the interference effects are eliminated due to the spectral separation of the pump beam and the probe beam, it is enough to modulate only the pump beam in order to provide the reference for the phase sensitive detection. Linear absorption traces show long exciton decay times (>2 ns) along all wavelength channels as can be seen in FIG. 10, which is consistent with the long decoherence times expected in strongly confined systems, where the discrete energy spectrum resembles that of individual atoms. The intensity of the signal is wavelength dependent, being determined by the number of quantum dots that couple with the probe field at each wavelength. For the systems studied the quantum dot density is about $5 \cdot 10$ cm$^{-2}$, meaning that more than 200 dots are in the field of view of the in-cryostat 40× objective. Consequently, more than one quantum dot contributes to each wavelength channel and the envelope of the signal is uniform rather than discontinuous.

In summary, a multi-channel lock-in spectrometer, capable of acquiring spectrally resolved data simultaneously over a plurality of wavelength channels, such as 320 wavelength channels, with a signal to noise ratio limited only by the laser noise. The system implemented was optimized for the 1.3 μm wavelength range, but with a proper choice of optical modulators the performance of the system can be optimized for any wavelength range. High efficiency in collecting spectrally resolved data, is particularly important for investigating the time resolved response of single quantum dots, which is typically characterized by small signal to noise ratios requiring extensive signal avenging and phase sensitive detection. Also, the emission linewidth of semiconductor quantum dots can be as small as 25 μeV. This combined with the variation in the optical response from a statistical ensemble of dots, due to inhomogeneities in size, composition and structure, implies that a relatively large wavelength range has to be investigated to identify signals of interest, which would be difficult without high efficiency detection systems, such as the one presented.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention. All of the publications, patent applications and patents cited in this specification are incorporated herein by reference in their entirety.

What is claimed is:

1. An optical system, comprising:
   a fiber decoupler;
   a polarizer, which is adapted to polarize light received from the fiber decoupler;
   a light deflector which is adapted to deflect polarized light from the polarizer in a direction as a function of time;
   a collimating lens, which is adapted to focus deflected light from the light deflector;
   a spectrometer which is adapted to receive focused light from the collimating lens and to separate light according to wavelength in a direction which is different from the direction of the light deflected by the light deflector; and
   a focal plane array;
   wherein the focal plane array is adapted to detect the light separated according to wavelength by the spectrometer along a first direction and to detect light deflected as a function of time by the light deflector along a second direction different from the first direction.

2. The optical system of claim 1, wherein the light deflector comprises an acousto-optic deflector.

3. The optical system of claim 1, wherein the a focal plane array comprises a two-dimensional semiconductor photodetector having a plurality of rows and columns of pixels, wherein each row of pixels is adapted to detect the light separated according to wavelength by the spectrometer for a given time.

4. The optical system of claim 3, wherein the light deflector is adapted to deflect light in a vertical direction as a function of time and the spectrometer is adapted to separate light according to wavelength in a horizontal direction, such that the wavelength separated light from the spectrometer is incident on a different row of pixels in the focal plane array at different time.

5. The optical system of claim 1, further comprising a digital signal processor electrically connected to the focal plane array, wherein the digital signal processor is adapted to Fourier decompose a time-domain information provided from the focal plane array to produce X and Y lock-in outputs for every wavelength channel.

6. An optical system, comprising:
   a fiber decoupler;
   a polarizer, which is adapted to polarize light received from the fiber decoupler;
   a first means for deflecting polarized light from the polarizer in a direction as a function of time;
   a collimating lens, which is adapted to focus deflected light received from the first means;
   a second means for receiving focused light from the collimating lens and for separating light according to wavelength in a direction which is different from the direction of the light deflected by the first means; and
   a third means for detecting the light separated according to wavelength by the second means along a first direction, and for detecting light deflected as a function of time by the first means along a second direction different from the first direction.

7. The optical system of claim 6, wherein the first means comprises an acousto-optic deflector and the second means comprises a spectrometer.

8. The optical system of claim 6, wherein the third means comprises a two-dimensional semiconductor photodetector having a plurality of rows and columns of pixels, wherein each row of pixels is adapted to detect the light separated according to wavelength by the second means for a given time.

9. The optical system of claim 6, wherein the first means deflects light in a vertical direction as a function of time and the second means separates light according to wavelength in a horizontal direction, such that the wavelength separated light from the second means is incident on a different row of pixels in the third means at different time.

10. The optical system of claim 6, further comprising a fourth means for Fourier decomposing a time-domain information provided from the third means to produce X and Y lock-in outputs for every wavelength channel.

11. An optical spectrometery method, comprising:
deflecting incident light in a direction as a function of time;
separating the deflected light according to wavelength in a direction which is different from the direction of the light deflection;
detecting the light separated according to wavelength along a first direction in a detector and detecting light deflected as a function of time along a second direction in the detector, wherein the second direction is different from the first direction; and
further comprising Fourier decomposing a time-domain information provided from detecting the light to produce X and Y lock-in outputs for every wavelength channel.

12. The method of claim 11, wherein an acousto-optic deflector is used to deflect the light and a spectrometer is used to separate the light.

13. The method of claim 11, wherein a two-dimensional semiconductor photodetector having a plurality of rows and columns of pixels is used to detect the light, wherein each row of pixels is adapted to detect the light separated according to wavelength for a given time.

14. The method of claim 13, wherein the light is deflected in a vertical direction as a function of time and the light is separated according to wavelength in a horizontal direction, such that the wavelength separated light is incident on a different row of pixels in the detector at different time.

15. The method of claim 11, wherein the spectrometry method comprises at least one of optical spectroscopy, Raman spectroscopy, photospectrometry, time-resolved absorption and time-resolved Kerr/Faraday rotation.

16. The method of claim 11, further comprising:
polarizing received light prior to the step of deflecting; and
focusing the deflected light prior to the step of separating.

17. The method of claim 11, further comprising decoupling received light prior to the step of polarizing.

* * * * *